March 29, 1960
W. E. FOLKERTS
2,930,358
POWER BOOSTING MECHANISM WITH FEEL-BACK
PRESSURE LIMITING VALVE
Filed Nov. 18, 1955
2 Sheets-Sheet 1
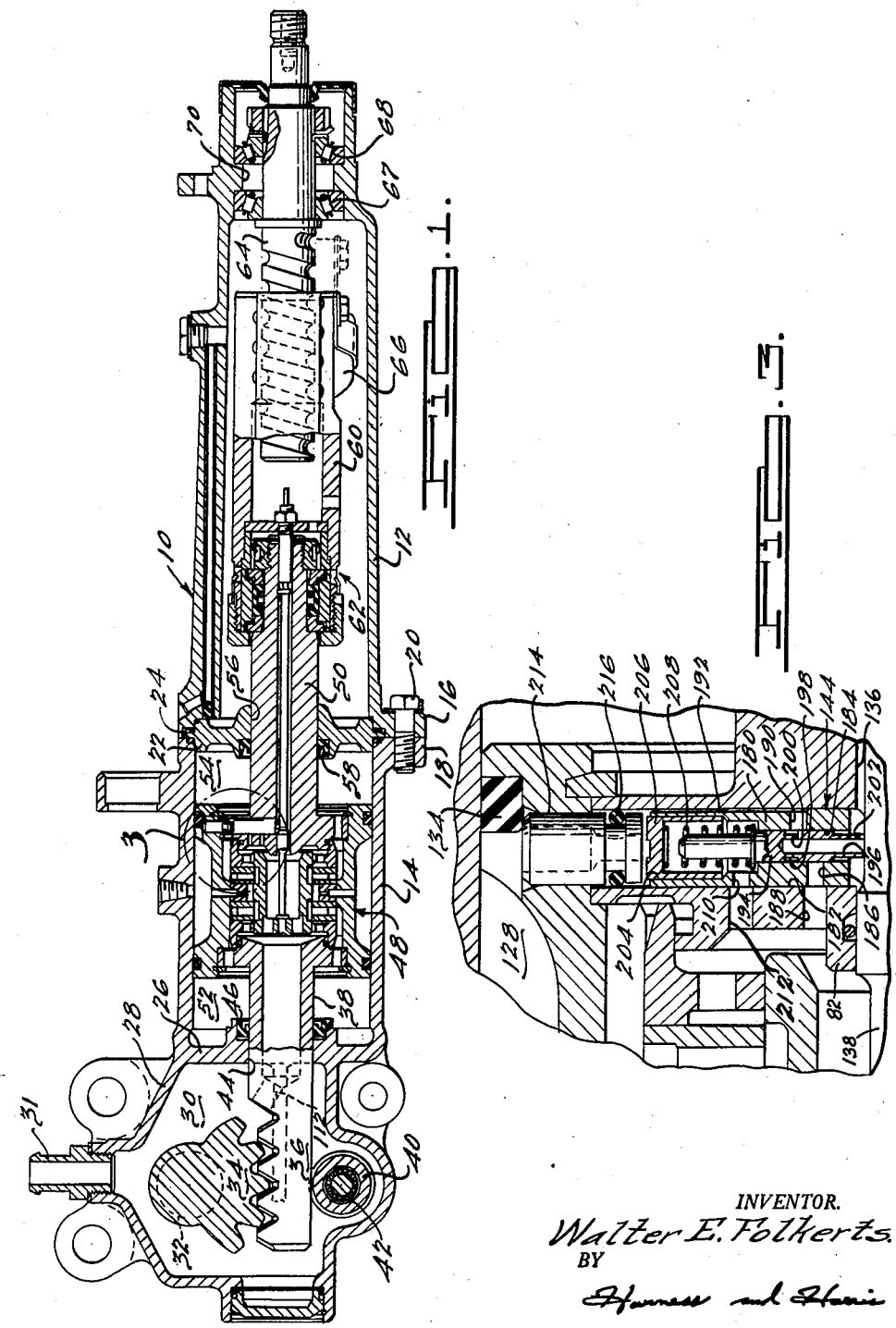
INVENTOR.
Walter E. Folkerts,
BY
ATTORNEYS.

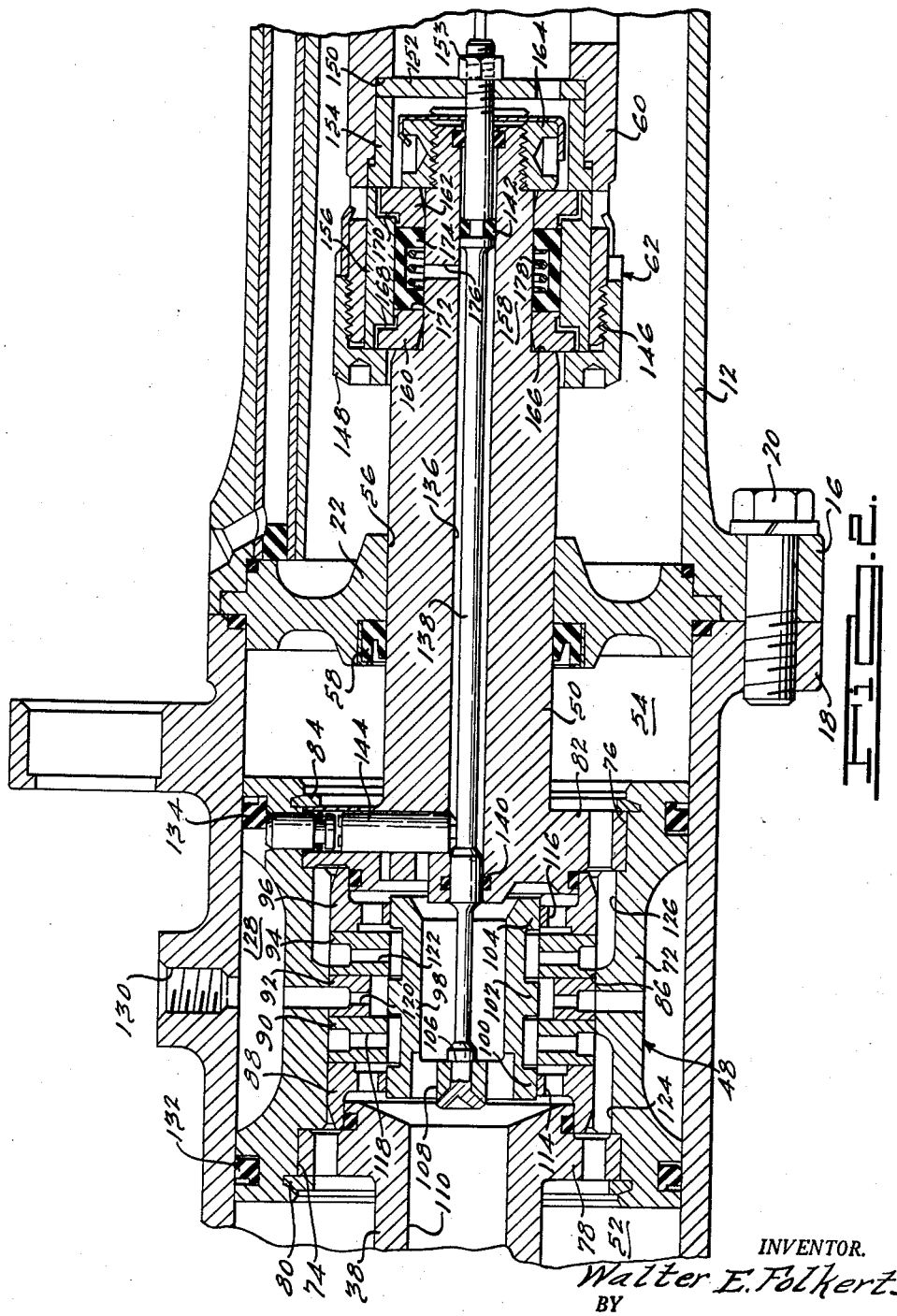

United States Patent Office

2,930,358
Patented Mar. 29, 1960

2,930,358

POWER BOOSTING MECHANISM WITH FEEL-BACK PRESSURE LIMITING VALVE

Walter E. Folkerts, Hazel Park, Mich., assignor to Chrysler Corporation, Highland Park, Mich., a corporation of Delaware Application November 18, 1955, Serial No. 547,714

4 Claims. (Cl. 121—41)

This invention relates generally to fluid pressure actuated power boosting mechanisms capable of being used in steering systems for automotive vehicles and in various types of fluid motor actuated control mechanisms. Such mechanisms often include a manually operable member and a driven member with provision for creating a feel-back pressure or resistance to the manual effort applied to the manually operable member, said resistance being proportional to the magnitude of the force required to displace the driven member.

More particularly my invention is directed to a means for limiting to a maximum value the magnitude of the manual effort necessary to overcome the above-mentioned resistance to movement of the manually operable portion of the mechanism thereby avoiding an excessive resistance to control movements of the manually operable member under certain extreme operating conditions.

My invention finds particular utility in power steering mechanisms for use with automotive vehicles wherein a fluid motor is situated between and operatively connected to the driving and driven portions of the steering system. The elements of the fluid motor form a mechanical connection between the manually operable member and the driven member thereby accommodating the transfer of a manual steering effort to the dirigible wheels of the vehicle. The fluid motor includes a steering pressure distribution valve situated in a working fluid circuit for selectively distributing working fluid pressure to either side of a piston member, the latter being slidably disposed in the working cylinder of the fluid motor. The fluid distribution valve is coupled to the manually operable member and actuated thereby in response to the manually applied steering effort. Movement of the valve in one direction results in a pressure build-up on either one side of the piston or the other depending upon the direction of the steering effort applied to the manually operable member, thereby creating a power boost which supplements the manual steering effort in controlling the direction of the dirigible vehicle wheels.

Pressure reaction means are situated in the driving portion of the mechanism for the purpose of exerting a pressure reaction force on the manually operable member and fluid pressure is transmitted thereto from a high pressure portion of the fluid circuit. The steering resistance obtained in this manner provides the operator with a normal steering resistance or "feel of the road" because of its proportionality to the steering requirements.

According to a principal feature of my invention provision is made for limiting the magnitude of the fluid pressure delivered to the pressure reaction means to values below a predetermined limit. At any pressure of the working fluid below this limiting value the magnitude of the feel-back will be proportional to the pressure buildup in the working fluid chambers of the fluid motor. At any pressure in excess of the limiting value, the feel-back will remain substantially constant and will be independent of any variation in the working fluid pressure of the fluid motor.

When the principles of my invention are applied to the steering mechanism of an automobile, the pressure buildup occurring in the fluid motor may become excessive when the dirigible wheels are turned during parking maneuvers or when the vehicle wheels are turned in either direction when the vehicle is stopped or moving very slowly. Under these circumstances, the manual steering effort becomes undesirably large thus causing a considerable degree of inconvenience. It is important that the magnitude of the pressure reaction exerted on the manually operable member be linearly proportional to a working pressure buildup under normal driving conditions in order that the vehicle operator will be provided with a normal steering sensation as above pointed out, but it is unnecessary for this linearity to exist during parking maneuvers since it is not necessary under these conditions for the driver to experience a "feel of the roads."

The provision of an improved fluid pressure reaction means of the type referred to above being a principal object of my invention, it is a further object of my invention to provide a valve mechanism in that portion of the fluid circuit which interconnects the pressure reaction means for the power boosting mechanism and the high pressure fluid circuit of the fluid motor wherein the elements of the valve mechanism form a part of said interconnecting circuit portion and are adapted to restrict the same progressively as the fluid pressure in the vicinity of the pressure reaction means approaches a limiting value.

Another object of my invention is to provide a valve mechanism of the type set forth in the preceding object wherein one of said valve elements comprises a valve sleeve situated in said interconnecting circuit portion and wherein the other of said valve elements is slidably disposed in said valve sleeve, said other valve element being normally spring biased in one direction to open said interconnecting circuit portion, the fluid pressure in the vicinity of the reaction means urging said other valve element in the opposite direction in opposition to the spring force to restrict said interconnecting circuit portion progressively.

For the purpose of particularly describing the structure of the instant invention, reference will be made to a power steering mechanism for an automotive vehicle as illustrated in the accompanying drawings wherein:

Figure 1 shows a longitudinal cross sectional view of a power steering mechanism including a fluid motor embodying the feel-back pressure limiting feature of my instant invention;

Figure 2 is an enlargement of a portion of the structure shown in Figure 1; and

Figure 3 is an enlargement of the portion shown in Figure 2.

Referring first to Figure 1, the power steering mechanism preferably includes a two-part cast outer housing shown generally at 10. Each of the housing parts is of a generally cylindrical configuration and they are identified in Figure 1 by numerals 12 and 14, the housing part 12 being hereinafter referred to as the upper housing portion, and the housing part 14 being hereinafter referred to as the lower housing portion. The housing portions 12 and 14 are joined in axial relationship and are provided with mating peripheral flanges 16 and 18 respectively, said flanges being bolted together by clamping bolts 20. A partition wall 22 may be disposed between the housing portions 12 and 14 in the vicinity of the flanges 16 and 18, said wall including a peripheral shoulder 24 situated in a mating recess formed in the flange 16 for fixing the partition wall 22 in position.

The lower housing portion 14 includes an end wall 26 and a lower cast section 28 preferably formed integrally with the lower housing portion 14. Cast section 28 defines a lower chamber 30 within which a rocker shaft 32 may be transversely disposed, and means may be provided for drivably connecting the rocker shaft 32 to the steering linkage elements of the steering system. A sector gear 34 is carried by the rocker shaft 32 and the teeth thereof are adapted to drivably engage a rack 36 formed on the end of an axially extending piston rod 38. By preference, a roller support 40 may be journalled in the cast section 28 by suitable needle bearings 42, said roller being formed with a grooved periphery for supporting gear rack 36.

The end wall 26 is apertured at 44 to slidably receive the piston rod 38 and a seal 46 is positioned about the inner periphery of the opening 44 as indicated. The piston rod 38 is joined to a piston generally designated by numeral 48 and another piston rod 50 is joined to and extends from the opposite side of the piston 48, said piston being slidably situated within the cylindrical housing portion 14 and defining therewith a pair of opposed working chambers indicated by numerals 52 and 54. The piston rod 50 extends through an opening 56 formed in the partition wall 22, and a suitable seal 58 is disposed about the opening 56 to prevent leakage of fluid from the working chamber 54.

The end of the piston rod 50 is connected to a nut member 60 by means of a lost motion connection generally designated by numeral 62, said nut member 60 being coaxially aligned with the piston rod 50. The lost motion connection 62 is capable of accommodating a relative axial movement of the nut member 60 with respect to the piston rod 50 during the steering operation as will later become apparent from the statement of the operation of the invention. One end of the nut member 60 is open and is formed with internal threads for threadably receiving an externally threaded, manually operable shaft 64. The external threads on the shaft 64 and the internal threads in the nut member 60 cooperate to define a helical groove of circular cross section which is capable of receiving a series of steel balls for accommodating a threaded driving connection between the shaft 64 and the nut member 60. A crossover channel 66 may be formed in the nut member 60 to transfer the balls from one groove to another thereby providing a recirculating circuit for the same.

The shaft 64 is journalled in the end of the upper cast housing portion 12 by suitable thrust bearings 67 and 68, the upper end of the cast housing portion 12 being formed with a reduced cross section and with an internal shoulder 70 which forms a backing for the outer races of the bearings 67 and 68. The outer end of the shaft 64 may be drivably connected to the steering shaft of a vehicle steering system.

For the purpose of obtaining a more complete understanding of the structure of the power steering mechanism illustrated in Figure 1, reference may be had to the copending application of Alan G. Loofbourrow, Serial No. 391,209, filed November 10, 1953, now Patent Number 2,837,167, issued June 3, 1958, which is assigned to the assignee of my instant invention.

Referring next to Figure 2, the piston structure 48 and the lost motion connection 62 will be described in more particular detail. The piston 48 is comprised of a main body portion 72 having recesses 74 and 76 situated on either axial end thereof. The piston rod 38 is formed with a flange 78 received within the recess 74 and is secured in place by a snap ring 80. Similarly the piston rod 50 is formed with an end flange 82 received within the recess 76 and secured in place by a snap ring 84. A central opening 86 is formed within the body portion 72 and a series of axially stacked and circular valve elements are positioned within the opening 86 between the above-mentioned piston rod flanges 78 and 82, said elements being identified by numerals 88, 90, 92, 94 and 96.

Each of the above-mentioned valve elements is formed with a central opening for slidably receiving a spool type valve element 98 on which is formed a series of axially spaced valve shoulders identified by numerals 100, 102 and 104. The spool valve element 98 is formed with a hollow interior and with an end wall 106 having one or more apertures 108 to provide fluid communication between the interior of the spool valve element 98 and the hollow interior 110 of the piston rod 38. The hollow piston rod interior 110 communicates with the chamber 30 enclosed by the lower cast housing section 28 through an opening 112 as indicated in Figure 1.

The valve elements 88 and 96 slidably cooperate with the valve shoulders 100 and 104 on the spool valve element 98 and are formed with axially extending passages 114 and 116 respectively. The valve elements 90, 92 and 94 are formed with radial passages 118, 120 and 122 which respectively communicate with the groove defined by the adjacent valve shoulders 100 and 102, with the groove defined by the adjacent valve elements 90 and 94 and with the groove defined by the adjacent shoulders 102 and 104. One end of the passage 118 communicates with the working chamber 52 through an axially extending passage 124 and the passage 122 communicates with the working chamber 54 through an axially extending passage 126. The passage 120 communicates at its outer end with an annular space 128 situated about the piston body 72 which in turn communicates with a fluid pressure supply port 130. Piston seals may be situated as indicated at 132 and 134 on either end of the piston body portion 72.

The piston rod 50 is formed with a central bore 136 within which is positioned a valve actuating rod 138, the latter being positively secured to the end wall 106 of the spool valve element 98. A fluid packing is positioned about the rod 138 as indicated at 140 and 142 at either end thereof, and the intermediate section of the rod 138 is formed with a reduced diameter to provide a fluid passage between a back pressure control valve generally designated at 144 and the lost motion connection 62. This fluid passage communicates with a radial passage extension connecting the interior passage of the piston rod 50 with the annular space 128 about the piston body portion 72 as will later become apparent from the description of the structure shown in Figure 3.

Referring next to the lost motion connection 62, the nut member 60 is formed with an externally threaded end 146 upon which is threadably received an end cap 148. An internal shoulder 150 is formed within the nut member 60 and a plate 152 is situated in registry therewith. The end of the valve actuator rod 138 may be positively connected to the plate 152 by a suitable threaded connection 153. A pair of circular spacers 154 and 156 is disposed within the end of the nut member 60 between the plate 152 and the end cap member 148, the latter holding the spacers 154 and 156 in fixed relationship with respect to the nut member 60.

The piston rod 50 is formed with a reduced diameter end 158 and a pair of lost motion or reaction elements 160 and 162 is slidably received over the same. A nut 164 is threadably connected to the reduced diameter end 158 of the piston rod 50 for the purpose of providing a shoulder against which the reaction element 162 may be seated. The other reaction element 160 may be seated against a shoulder 166 formed on the piston rod 50.

It will be apparent from an inspection of Figure 2 that a lost motion gap is formed between one side of each of the lost motion elements 160 and 162 as indicated at 168 and at 170 respectively. The other side of each of the lost motion elements 160 and 162 is adapted to normally engage the end cap member 148 and the spacer 154 respectively.

The spacer 156 and the lost motion elements 160 and 162 define an annular reaction chamber 172 within which is positioned an annular sealing element 174 formed of resilient material. The interior of the element 174 communicates with the fluid passage defined in part by the central piston rod bore 136 and a branch passage 176. If desired, a compression spring 178 may be interposed between the end walls of the sealing element 174.

Referring next to Figure 3, the above-mentioned back pressure control valve 144 is shown in more particular detail and it comprises a sleeve 180 positioned within a radially extending opening 182 formed in the flange 82 of the piston rod 50 and in the piston body portion 72. The sleeve 180 is formed with a central opening 184, one end of which extends to the fluid passage defined by the piston rod bore 136. A first port 186 is formed in the sleeve 180 to provide communication between the opening 184 and a passage 188 formed in the piston rod flange 82, said passage 188 communicating with the interior of the spool valve element 98. A second port 190 is formed in the sleeve 180 and communicates with a flat 192 formed on the sleeve 180 to permit the transfer of fluid pressure from a radially outward location to the interior of the sleeve 180. A movable valve element 194 is slidably received within the opening 184 and is formed with an axially extending bore 196 as indicated. The bore 196 communicates with an external groove 198 through a port 200. Said groove 198 is positioned in the vicinity of the port 190 above mentioned. The lower end of the bore 196, Fig. 3, communicates with the passage defined by the piston rod bore 136 by means of a port 202 in the valve element 194. The lower end of the valve element 194 is adapted to engage the valve actuator rod 138 and is reduced in diameter to provide communication between passage 186 and bore 136 when the valve element 194 is shifted upward as explained below.

The upper end of the sleeve 180 is formed with a relatively large diameter opening 204 within which the radially outward end of the valve element 194 extends. An insert 206 is telescopically received within the opening 204 and may be retained therein by means of a press fit or by any other suitable retaining means. A shoulder is formed on the valve element 194 to provide a spring seat and a spring 208 is interposed between the spring seat and the insert 206 for normally biasing the valve element 194 in a radially inward direction. A port 210 is formed in the radially outward portion of the sleeve 180 to provide communication with a passage 212 communicating with the interior of the spool valve element 98. The port 210 and passage 212 accommodate the discharge and entry of fluid which is displaced from the interior of the relatively large diameter opening 204 of the sleeve 180 as the valve element 194 moves radially outward or inward during operation of the steering mechanism.

The radial openings formed in the piston rod flange 82 and in the piston body portion 72 are held in alignment by an insert 214 securely retained within the piston body portion 72. The insert 214 is formed with a central passage to provide communication between the annular space 128 and the passage defined by the flat 192. A groove is formed on one end of the insert 214 to receive a packing 216 to prevent the loss of feel-back pressure from the interior of the opening 182.

During operation of the steering mechanism above described, the vehicle operator may rotate the shaft 64 in one direction or the other depending upon the direction of the applied torque. When a clockwise turning effort is applied to the shaft 64, the nut member 60 will be moved to the right as viewed in Figure 1, and the lost motion element 160 will be separated from the shoulder 166, thus causing the lost motion gap 170 to become smaller. The pressure exerted by the spring 178 and the fluid pressure within the fluid seal 174 of the lost motion connection 62 tend to oppose this relative motion between the lost motion element 160 and the piston rod 50, thereby to effect the feel-back pressure referred to above. It will also be apparent that movement of the nut member 60 in a right hand direction, as above indicated, will force the piston rod 50 in the right hand direction, thereby to force the piston structure 48, piston rod 38 and gear rack 36 to the right, causing rotation of the gear sector 34 in a counterclockwise direction, as viewed in Figure 1. The latter rotation in turn imparts a right hand steering effort to the dirigible wheels of the vehicle through the steering linkage mechanism.

This manually applied steering effort will be accompanied by a power assist by reason of a pressure buildup which takes place in the working chamber 52 due to shifting movement of the spool valve element 98 with respect to the valve elements 88 through 96. This shifting movement of the valve 98 occurs by reason of the fact that the valve actuator rod 138 is positively joined to the nut member 60 and adapted to shift with respect to the piston rod 50 as the lost motion gap 170 becomes reduced in size as above described. It will therefore be apparent that the annular space between the valve shoulder 102 and the adjacent edge of the valve element 122 will become reduced in size while the annular space between the shoulder 102 and the adjacent edge of the valve element 118 will simultaneously become increased in size. A substantial portion of the fluid entering the high pressure port 130 and the passage 120 will enter the groove defined by the spaced valve shoulders 100 and 102 and enter the working chamber 52 through the passages 118 and 124.

Simultaneously with the above, the annular space between the shoulder 104 and the valve element 94 is increased in size and the annular space between the shoulder 102 and valve element 94 is reduced in size. It is thus seen that a pressure buildup will occur in working chamber 52 thereby causing the piston structure 48 to move to the right as viewed in Figures 1 and 2, and the fluid within the working chamber 54 will become exhausted through the passages 126 and 122, through the space between the shoulder 104 and the valve element 94, through the port 116, through the hollow interior of the spool valve element 98 and through the hollow interior 110 of the piston rod 38 to the exhaust chamber 30 in the lower housing cast section 28. This latter chamber 30 communicates with a suitable exhaust port indicated in Figure 1 by numeral 31. When the shaft 64 is rotated in the opposite direction it will be apparent that the spool valve element 98 will shift to the left with respect to the stationary valve elements 88 through 96, thereby increasing the degree of restriction in the fluid connection between working chamber 52 and the high pressure port 130 while simultaneously decreasing the degree of restriction with this same pressure port 130 and the working chamber 54. Simultaneously the degree of communication between the exhaust passages and the working chambers 54 and 52 are decreased and increased respectively. The movement of the piston rods and piston assembly to the left, as viewed in Figures 1 and 2, will be accompanied by a displacement of the lost motion element 162 from the shoulder formed on the nut element 164. The fluid pressure and spring pressure in the annular chamber occupied by the seal 174 will again tend to oppose the accompanying relative motion between the lost motion elements 160 and 162.

The spring 178 in the lost motion connection 62 may be omitted if desired, and the feel-back or resistance to relative motion between the lost motion elements 160 and 162 may be due entirely to the hydraulic pressure existing therebetween.

The hydraulic pressure is transmitted to the pressure reaction chamber in the lost motion connection 62 through the central opening formed in the piston rod 50 and through the radially extending opening 182 formed in the piston assembly. As indicated in Figure 3, the position of the movable valve element 194 is such that the port 200 is in fluid communication with the passage 190 and the radially extending passage defined by the flat 192. Also the passage 186 is normally closed by the valve element 194 to prevent communication between the exhaust circuit and the hydraulic feel-back pressure passage. The spring 208 is capable of maintaining the valve element 194 in the position indicated in Figure 3 throughout the normal operating range of the steering mechanism. However, if the pressure buildup in the annular space 128 and at either of the working chambers 52 and 54 should increase to a relatively high value during parking maneuvers of the vehicle, the hydraulic reaction pressure in the lost motion connection 62 and in the reaction pressure passage defined by the piston rod opening 136 will cause the valve element 194 to move radially outward (upward in Fig. 3) with respect to the valve actuator rod 138 against the biasing effort of the spring 208. Thus the passage 190, which leads to the pressure source, is restricted and communication between the passages 136 and 186 is established around the lower reduced end of the valve element 194, thereby to exhaust the excess feel-back pressure into the low pressure exhaust circuit 30, 31 of the steering system. It is apparent that the feel-back pressure in passage 136 cannot exceed the predetermined pressure at which upward shifting of element 194 against the tension of spring 208 closes passage 190. Any further increase in working pressure in either of the working chambers will be blocked by the closed passage 190 and cannot be transmitted as feel-back pressure to the lost motion connection 62.

At pressures less than this predetermined value, the feel-back pressure will vary linearly with the magnitude of the working pressure and since the feel-back pressure tends to oppose a relative movement on the reaction elements 160 and 162 in direct opposition to the manual effort applied to the shaft 64 and the nut 69, and since it is necessary for the vehicle operator to overcome the hydraulic force exerted on the reaction elements before a power boost can be effected, the steering effort will vary proportionally with the magnitude of the steering resistance offered to the dirigible wheels. It is only after the predetermined limit has been obtained that this proportionality will be eliminated and thereafter the steering effort will be opposed by a constant resistance.

Although I have particularly described one preferred embodiment of my instant invention, I contemplate that many variations thereto may be made without departing from the scope of the invention as defined by the following claims.

I claim:

1. In a power boosting mechanism, a fluid motor comprising a cylinder, a piston slidably received in said cylinder and defining therein a fluid working chamber, a piston rod secured to said piston, a manually operable member, a lost motion connection between said piston rod and said manually operable member including relatively movable reaction elements engageable with said piston rod and said manually operable member, said lost motion connection accommodating a limited degree of relative movement between said piston rod and said manually operable member, said relative movement being accompanied by a relative shifting movement of said reaction elements, conduit means for transmitting fluid pressure to said working chamber, valve means disposed in and partly defining said conduit means for controlling the degree of communication between said working chamber and said conduit means, said valve means including relatively movable valve elements, one of said valve elements being positively connected to said manually operable member, a reaction pressure passage extending from the high pressure portion of said fluid motor to the vicinity of said reaction elements for accommodating the delivery of reaction pressure thereto, thereby producing a reaction force opposing the lost motion between said piston rod and said manually operable member, means for controlling the magnitude of the reaction pressure buildup including a reaction pressure control valve situated in and partly defining said reaction pressure passage, said control valve comprising a hollow valve sleeve situated in said reaction pressure passage with one end thereof communicating with the latter, a port formed transversely in the wall of said sleeve, a movable valve member slidably received within said sleeve and adapted to progressively restrict said port upon movement thereof in one direction thereof under the reaction of the fluid pressure, and spring means situated in said sleeve for biasing said movable valve member in the opposite direction to normally open said valve port to permit the free passage of reaction pressure to said lost motion connection.

2. In a power boosting mechanism, a fluid motor comprising a cylinder, piston structure slidably disposed in said cylinder and defining therein a pair of opposed working chambers, a piston rod secured to said cylinder, a manually operable member, a lost motion connection between said piston rod and said manually operable member including a spaced pair of reaction elements engageable with said piston rod and said manually operable member, pressure delivery conduit means for transmitting fluid pressure to said cylinder, exhaust conduit means for conducting fluid from said cylinder, branch passage means communicating with each of said working chambers and forming a portion of said pressure delivery conduit means and said exhaust conduit means, valve means situated in and forming a part of said branch passage means including relatively movable valve elements for selectively distributing fluid pressure to one of said working chambers and for selectively increasing the degree of communication between one of said working chambers and said delivery passage means while simultaneously increasing the degree of communication between the other working chamber and said exhaust conduit means, one of said relatively movable valve elements being positively connected to the manually operable member, and another of said valve elements being positively connected to said piston, a reaction pressure passage interconnecting a high pressure portion of said fluid motor and said lost motion connection for exposing said reaction elements to fluid pressure thereby creating a reaction force tending to oppose the lost motion between said piston rod and said manually operable member, and a reaction pressure control valve means situated in said reaction pressure passage comprising a hollow valve sleeve, a first port formed transversely in said sleeve forming a portion of said reaction pressure passage, a second valve port formed in said valve sleeve communicating with said exhaust conduit means, a movable valve element slidably disposed in said valve sleeve with one portion thereof exposed to said reaction fluid pressure for urging said valve element in one direction, spring means for normally urging said valve element in the opposite direction, said valve element normally blocking said second port and said first port remaining normally open during operation of said mechanism, said valve element being shiftable under the influence of reaction pressure buildup in excess of a predetermined limiting value against the opposition of said spring means to simultaneously open said second port while restricting said first port, thereby limiting the magnitude of the opposition to the lost motion between said piston rod and said manually operable member.

3. In a power boosting mechanism comprising a fluid motor having a driven member, a driving member, passage means for transmitting fluid pressure to said fluid motor for actuating said driven member, valve means situated in a portion of said passage means for regulating the working pressure in said motor, said valve means including a valve element operatively connected to and actuated by said driving member, pressure reaction means for resisting movement of said driving member, a reaction pressure passage interconnecting said reaction means with a high pressure portion of said motor, control valve means for controlling the degree of communication of said reaction means with said high pressure fluid motor portion, said control valve means comprising a hollow valve sleeve situated in said reaction pressure passage with one end communicating with the latter passage, a port formed transversely in the well of said sleeve, a movable valve member slidably received within said sleeve and adapted to progressively restrict said port upon movement of said valve member in one direction under the reaction of the fluid pressure, and spring means situated in said sleeve for biasing said movable valve member in the opposite direction to normally open said valve port to permit the free passage of reaction pressure to said reaction means.

4. In a power boosting mechanism comprising a fluid motor having a driven member, a driving member, passage means for transmitting fluid pressure to said fluid motor for actuating said driven member, valve means situated in a portion of said passage means for regulating the working pressure in said motor, said valve means including a valve element operatively connected to and actuated by said driving member, pressure reaction means for resisting movement of said driving member, a reaction pressure passage interconnecting said reaction means with a high pressure portion of said motor, and control valve means for controlling the degree of communication of said reaction means with said high pressure fluid motor portion, said control valve means comprising a hollow valve sleeve, a first port formed transversely in said sleeve forming a portion of said reaction pressure passage, an exhaust port formed in said valve sleeve, a movable valve element slidably disposed on said valve sleeve with one portion thereof exposed to the reaction pressure in said reaction pressure passage for urging said valve element in one direction, spring means for normally urging said valve element in the opposite direction, said valve element normally blocking said exhaust port and said first port remaining normally open during operation of said mechanism, said valve element being shiftable under the influence of said reaction pressure in excess of a predetermined limiting value against the opposition of said spring means to simultaneously open said exhaust port while restricting said first port, thereby limiting the magnitude of said reaction pressure.

References Cited in the file of this patent
UNITED STATES PATENTS

| | | |
|---|---|---|
| 2,596,242 | Hill | May 13, 1952 |
| 2,722,199 | Blanchette | Nov. 1, 1955 |
| 2,824,314 | Davis | Feb. 25, 1958 |